Patented Mar. 20, 1928.

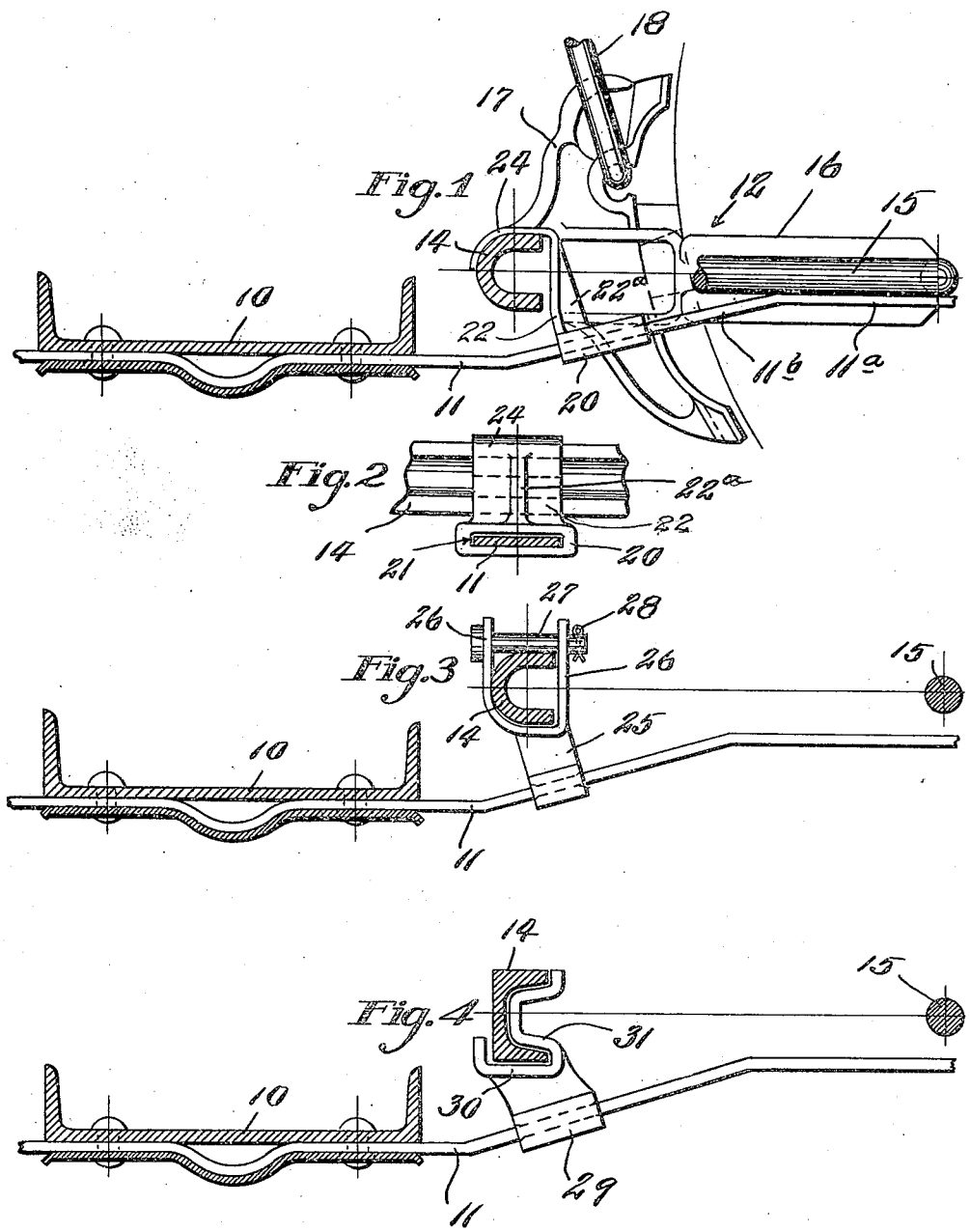

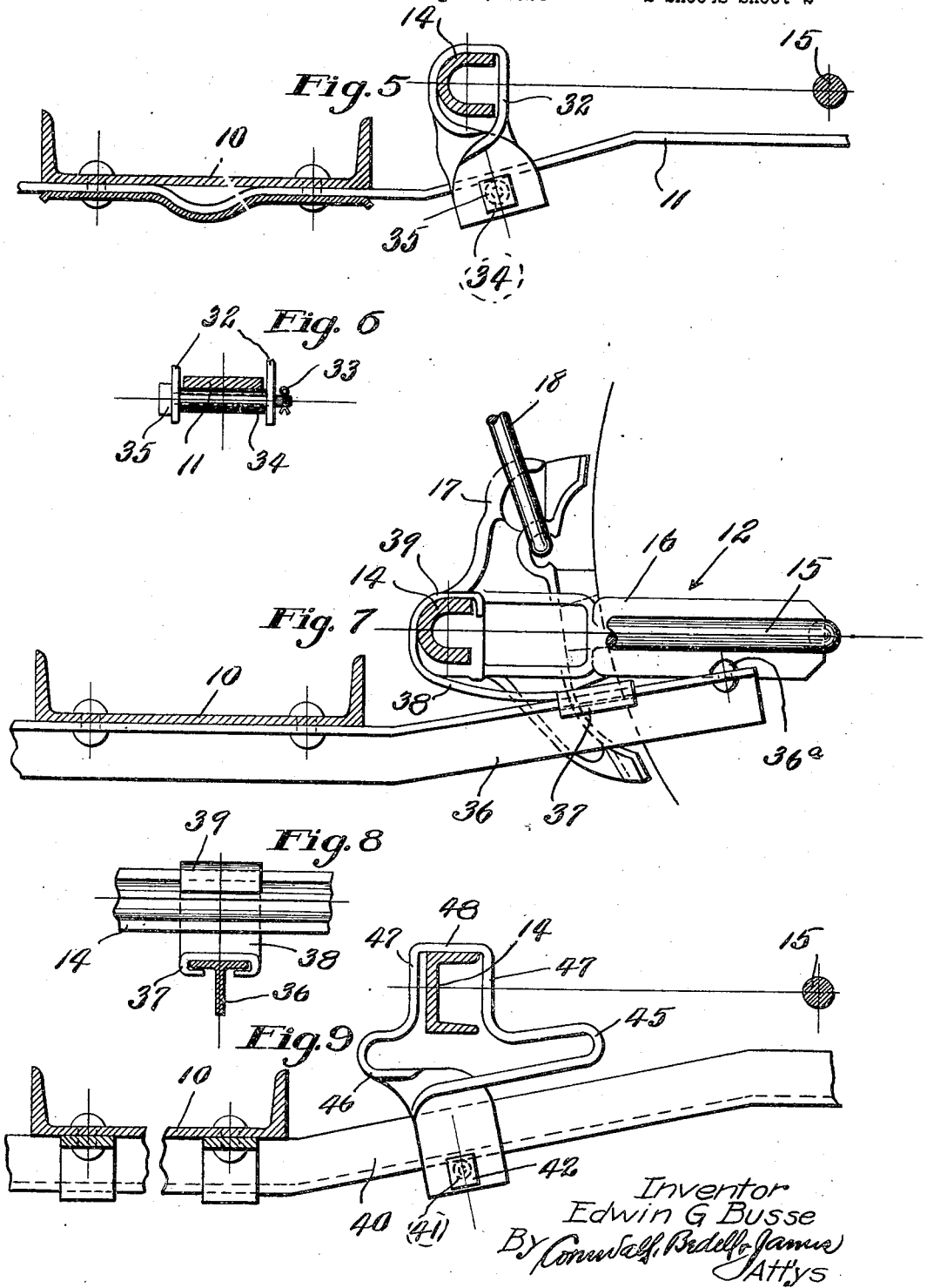

1,662,916

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SAFETY GUARD AND SUPPORT FOR BRAKE BEAMS.

Application filed August 26, 1924. Serial No. 734,202.

This invention relates to new and useful improvements in safety guards and supports for brake beams and the objects of the invention are to provide a device slidably arranged on the safety bar or track member and engaging the brake beam so as to prevent upward or downward movements of the beam and hold said beam against accidental tilting, thereby eliminating dragging of the top of the brake shoe on the tread of the car wheel.

Further objects of the invention are to provide a member removably positioned on the track or safety bar and engaging the rear part of a brake beam and holding it against upward movement so that the brake shoe is maintained at all times in parallelism with the tread of the car wheel.

Still further objects of the invention are to provide simple means for slidably interengaging said beam engaging member with the safety or track member whereby any stresses exerted against said brake beam engaging member are transmitted to said track member which cooperates with said brake beam engaging member and hold the beam in proper position.

With these and further objects in view, my invention consists in certain novel features of construction and arrangement of parts, hereinafter more fully described and claimed, and illustrated in the accompanying drawings, in which—

Figure 1 is a side elevational view of the preferred form of safety guard and support and the safety bar therefor.

Figure 2 is an end elevational view of said guard with the track member in cross section.

Figure 3 is a side elevational view of a modified form of safety guard.

Figure 4 is a side elevational view of another modified form of safety guard.

Figure 5 is a side elevational view of a still further modified form of safety guard.

Figure 6 is a transverse cross section of the track member showing the lower end of the safety guard shown in Figure 5 in engagement therewith.

Figure 7 is a side elevational view of a still further modified form of safety guard and support.

Figure 8 is an end elevational view of said safety guard with the track member in transverse cross section.

Figure 9 is a still further modified form of safety guard.

As is well known in the art, the brake beam pivots on the brake beam hangers and in order to prevent undue tilting movement of said brake beam I provide means cooperating with the safety bar or track member, which latter extends under the beam and said means are either carried by said safety bar and engage the rear part of a brake beam, or vice versa, so that the brake shoes carried by said beam are maintained parallel to the treads of the car wheels. The safety guard or track member, or both, may be resilient to provide flexible interengagement between said beam and the track part to which said track member is attached, thereby allowing a certain degree of yielding movement of the brake beam without danger of distortion or injury to either the brake beam or the safety bar. The safety guard and support operating on the safety bar or track member are preferably held against movement in vertical plane relative to said bar and this may be accomplished either by providing said safety guard and support with either integral bar engaging portions or with separate detachable means which engage the underside of the safety bar.

Referring by numerals to the accompanying drawings, 10 indicates a part of a car truck, such as a spring plank, to which is secured a transversely disposed safety bar or track 11 which extends under a brake beam 12 which is, in the present instance, of the trussed type and comprises a compression member 14, a tension member 15, a strut 16, brake head 17, and brake hangers 18, the latter pivotally supporting said brake beam. The track member 11 in the present form is made resilient and has an extreme end portion 11$^a$, which is adapted to slidably support the tension member 15, and an intermediate inclined portion 11$^b$ on which is slidably mounted a safety guard or chair 20. This chair or sliding member is provided with an opening 21 through which the bar 11 operates and holds said chair against upward movement relative to said track.

Extending upwardly from chair 20 is an arm 22 which is positioned forwardly of compression member 14 and the extreme end 24 of said arm is bent rearwardly and downwardly over the top of said compression member and serves to hold the rear part of the brake beam against upward movement and prevents undue tilting thereof. Arm 22 is preferably formed with a reinforcing rib 22ᵃ and end 24 may be formed flexible or rigid as desired and depending on the degree of flexibility of the safety bar 11. The construction illustrated permits member 14 to turn in portion 24 by the arm 22 to the extent desirable for arm 22 to slide freely on track 11. The open hook-like extension on arm 22 permits ready assembly and disassembly of the beam from the arm as the beam may be tilted manually, by lifting the tension member 15 until the compression member 14 may be moved rearwardly from beneath hook 24.

In the form shown in Figure 3, a sliding chair 25 is provided with upwardly projecting rigid arms 26 which are disposed to each side of the compression member and the ends of said arms project above said member and receive a bolt or pin 27 secured against removal by a cotter pin 28. Thus the chair is interengaged with the compression member and holds it against movement in either upward or downward direction.

The modified form disclosed in Figure 4 shows a chair 29 having a seat 30 for receiving the lower portion of the compression member and provided with an arm 31 which is shaped to fit between the horizontally disposed flanges of said compression member, thereby forming interlocking connection between the chair of said beam.

In the form shown in Figures 5 and 6, a rigid strap 32 is bent over the compression member and the ends of said strap extend downwardly past the sides of the safety bar and receive a roller 34 which rides against the underside of said bar and is held in position between the ends of chair 32 by a bolt or pin 35, the ends of which are seated in the ends of strap or chair 32 and held in position therein by a cotter pin 33.

In the forms just described the safety bar is formed flexible. In the form shown in Figure 7 a rigid safety bar 36 is secured to the spring plank and is preferably T-shape in cross section. A sliding member or chair 37 having its edges bent downwardly and inwardly over the horizontally disposed flanges of bar 36 is mounted thereon and is held in cooperative engagement with said bar through the interengagement of its underhung portions with the flanges of the bar. To prevent accidental displacement of chair 37 from bar 36, the end of said bar is provided with a proturberance such as a rivet 36ᵃ which forms a stop for said chair. Extending rearwardly from chair 37 under the compression member 15 and then upwardly is a flexible arm 38 having its end 39 rebent forwardly and downwardly over the upper portion of said compression member. Thus a flexible support is provided for the rear part of the beam and said support bears on top of the compression member and holds it against upward movement.

In the form shown in Figure 9 a rigid flanged bar 40 is secured to the spring plank and has its flanged portion or portions presented upwardly. A roller 41 carried by a pin or bolt 42 engages the underside of said bar and prevents the upward movement of a support 44 in the ends of which said pin 42 is mounted. Support 44 is preferably made of a strap bent to provide a forwardly presented loop 45 and a rearwardly extended loop 46 which increase the resiliency of said support. Said loops have extended therefrom upstanding legs 47 arranged to each side of compression member 16 and the upper ends of said legs are united by a horizontally disposed portion 48 which bears against the top of said compression member and limits the upward movement thereof.

I claim:

1. A device for guarding or supporting a trussed brake beam comprising a supporting bar for underlying a brake beam, a member slidably mounted thereon and having means in engagement with said bar for preventing relative movement of said member in a vertical plane, and an extension on said member for engaging the compression member of said brake beam, independently of the tension member of said brake beam, for maintaining said beam in proper angular position.

2. A device for guarding or supporting a trussed brake beam comprising in combination a device having one end adapted to pivotally engage the compression member of the beam and means on the opposite end of said device adapted to slidably and nonpivotally engage a safety bar so as to hold said device against upward movement relative thereto.

3. In a device for guarding or supporting a trussed brake beam, the combination of a stationary bar adapted to be secured to a part of a car truck, and a member in sliding engagement with said bar and embracing said bar to prevent movement of said member in a vertical plane, said member being adapted to pivotally engage the compression member of a brake beam to control vertical movement of the compression member of said beam.

4. A device for guarding or supporting a trussed brake beam comprising in combination with a fixed truck part, of a track member secured thereto, and a sliding member slidably supported on said track member and having portions engaging the underside of said track member to prevent vertical movement of said sliding member, said sliding member being adapted to pivotally engage the compression member of a brake beam and hold it against vertical movement without controlling vertical movement of the tension member of the beam, one of said members being flexible.

5. A device for guarding or supporting a trussed brake beam comprising in combination with a truck part, of a track member secured thereto, and a sliding member slidably supported on said track member and held against vertical movement relative thereto and adapted to engage the compression member of a brake beam and limit its pivotal movement about its axis, one of said members being resilient to render said limitation yielding.

6. In combination, a brake beam, a track member adapted to be fixed to a part of a car truck, a support member in sliding engagement with said track member, means for interengaging said support member with the compression member of said brake beam and maintaining said compression member in predetermined relation with said track member, and means on said support member engaging the underside of said track member to prevent movement of said support member in a vertical plane, one of said members being resilient to provide a flexible supporting connection between said beam and said truck part.

7. A device for guarding or supporting a trussed brake beam comprising a fixed bar, a member slidably mounted thereon and held against relative vertical movement, and a hook-like extension on said member adapted to be assembled with the compression member of a beam by manually tilting the beam to an abnormal degree.

8. In combination, a trussed brake beam, a safety guide or support arm beneath the same and adapted to be fixed to a truck part, and means mounted on said guide for maintaining the bodily movement of the compression member of said beam in a desired path without interfering with the pivotal movement of said compression member about its own longitudinal axis.

9. A device for guiding or supporting a truss brake beam comprising a fixed bar for underlying the beam, a member slidably supported on said bar and interlocked therewith against vertical movement and adapted to hold the brake beam compression member against vertical movement, independently of such movement by the brake beam tension member, so as to maintain the brake beam in desired angular position.

In testimony whereof I hereunto affix my signature this twenty-first day of August, 1924.

EDWIN G. BUSSE.